(12) United States Patent
Wuolijoki

(10) Patent No.: US 10,791,323 B2
(45) Date of Patent: Sep. 29, 2020

(54) SYSTEM AND METHOD FOR PROCESSING IMAGES FOR DISPLAY APPARATUS

(71) Applicant: Varjo Technologies Oy, Helsinki (FI)

(72) Inventor: Jarno Wuolijoki, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 71 days.

(21) Appl. No.: 16/223,657

(22) Filed: Dec. 18, 2018

(65) Prior Publication Data

US 2020/0195913 A1 Jun. 18, 2020

(51) Int. Cl.
*H04N 13/383* (2018.01)
*G06F 3/01* (2006.01)
*G06K 9/32* (2006.01)
*H04N 5/232* (2006.01)

(52) U.S. Cl.
CPC .......... *H04N 13/383* (2018.05); *G06F 3/013* (2013.01); *G06K 9/3233* (2013.01); *H04N 5/23232* (2013.01); *H04N 5/23267* (2013.01)

(58) Field of Classification Search
CPC .......... H04N 5/23232; H04N 5/23267; H04N 13/383; G06F 3/013; G06K 9/3233
See application file for complete search history.

(56) References Cited

U.S. PATENT DOCUMENTS

| 9,779,478 | B1 | 10/2017 | Wilson et al. | |
| 2017/0263046 | A1* | 9/2017 | Patney | G06F 3/013 |
| 2017/0365101 | A1* | 12/2017 | Samec | A61B 5/4094 |

(Continued)

FOREIGN PATENT DOCUMENTS

| WO | 2000062543 A1 | 10/2000 |
| WO | 2018100238 A2 | 6/2018 |

OTHER PUBLICATIONS

Notification of Transmittal of the International Search Report and the Written Opinion of the International Searching Authority, or the Declaration issued in International Patent Application No. PCT/FI2019/050847 dated Jan. 30, 2020, 16 pages.

(Continued)

*Primary Examiner* — Abdelaaziz Tissire
*Assistant Examiner* — John H Morehead, III
(74) *Attorney, Agent, or Firm* — Ziegler IP Law Group, LLC

(57) ABSTRACT

A system for processing images for display apparatus, system is communicably coupled to display apparatus, display apparatus including first and second image renderers, system includes image source and processor, wherein image source produces input image, processor of system being configured to: process input image to generate first image such that first region of first image is blurred and its intensity is reduced with respect to intensity of corresponding region of input image; and process input image to generate second image, second image corresponding to cropped region of input image, intensity of second image being adjusted according to intensity of aforesaid first region; wherein processor of system or processor of display apparatus renders first and second images at first and second image renderers, respectively, projections of rendered first and second images being optically combined such that projection of rendered second image overlaps with projection of first region of first image.

35 Claims, 3 Drawing Sheets

(56) References Cited

U.S. PATENT DOCUMENTS

2018/0308266 A1   10/2018  Surti et al.
2019/0318530 A1*  10/2019  Hunt ...................... G06T 15/06

OTHER PUBLICATIONS

Notification of Transmittal of the International Search Report and the Written Opinion of the International Searching Authority, or the Declaration issued in International Patent Application No. PCT/FI2019/050848 dated Jan. 30, 2020, 14 pages.

* cited by examiner

SYSTEM AND METHOD FOR PROCESSING IMAGES FOR DISPLAY APPARATUS

TECHNICAL FIELD

The present disclosure relates generally to image processing; and more specifically, to systems for processing images for display apparatuses. Moreover, the present disclosure relates to methods for processing images for display apparatuses. Furthermore, the present disclosure also relates to computer program products comprising a non-transitory machine-readable data storage medium having stored thereon program instructions that, when accessed by a processing device, cause the processing device to execute the aforementioned methods.

BACKGROUND

Presently, several specialized devices (for example, such as virtual reality headsets, a pair of virtual reality glasses, augmented reality headsets, a pair of augmented reality glasses, mixed reality headsets, a pair of mixed reality glasses, and the like) are being used by users for experiencing and interacting with simulated environments (for example, such as virtual reality, augmented reality, mixed reality, and the like). Such simulated environments enhance the user's experience of reality around him/her and providing the user with a feeling of immersion within the simulated environments, using contemporary techniques such as stereoscopy. Such specialized devices are commonly known as head mounted displays (HMDs).

Such devices generally display different views of a given image on separate image renderers (for example, such as displays) for both eyes of the user. As a result, the user is able to perceive stereoscopic depth within the given image. Nowadays, such devices are being designed to imitate a physiology of human vision by displaying foveated images to the user. Such foveated images have a variable resolution, wherein different regions of a given foveated image have different resolutions.

Conventionally, a foveated image is formed by combining different images having different resolutions. Such different images are required to be optically combined with each other in a manner that the foveated image appears continuous to the user. In other words, a gradient between such different images is required to be minimal, so that the user is unable to perceive such different images as separate images. However, generating the different images that form the foveated image has a number of problems associated therewith. Firstly, since conventional image processing techniques are not sufficiently well-developed, the different images generated by way of such techniques yield a suboptimal foveated image. Often, such different images have improper resolution, improper pixel brightness, and the like. Secondly, misalignment between such different images during their optical combination leads to improper pixel intensities along common edge(s) between the different images of the foveated image. Specifically, upon combining such different images, in overlapping portions of the common edge(s), the pixel intensities would be too high, whereas in gap portions along the common edge(s), the pixel intensities would be too low. The different images generated by way of the conventional image processing techniques are unable to compensate for the slightest misalignment during their optical combination.

Therefore, in light of the foregoing discussion, there exists a need to overcome the aforementioned drawbacks associated with generating images for display apparatuses.

SUMMARY

The present disclosure seeks to provide a system for processing images for a display apparatus. The present disclosure also seeks to provide a method for processing images for a display apparatus. The present disclosure also seeks to provide a computer program product comprising a non-transitory machine-readable data storage medium having stored thereon program instructions that, when accessed by a processing device, cause the processing device to execute a method for processing images for a display apparatus. The present disclosure seeks to provide a solution to the existing problem of suboptimal image processing techniques for producing images for a display apparatus. An aim of the present disclosure is to provide a solution that overcomes at least partially the problems encountered in prior art, and provides an efficient and reliable system for producing images for the display apparatus.

In one aspect, an embodiment of the present disclosure provides a system for processing images for a display apparatus, the system being at least communicably coupled to the display apparatus, the display apparatus comprising at least one first image renderer and at least one second image renderer, the system comprising an image source and at least one processor communicably coupled to the image source, wherein the image source is to be employed to produce an input image, the at least one processor being configured to:
  process the input image to generate a first image in a manner that at least a first region of the first image is blurred with respect to a corresponding region of the input image, an intensity of the first region of the first image is reduced with respect to an intensity of the corresponding region of the input image; and
  process the input image to generate a second image in a manner that the second image corresponds to a cropped region of the input image and an intensity of the second image is adjusted according to the intensity of the first region of the first image;
wherein the at least one processor or a processor of the display apparatus is configured to render the first image at the at least one first image renderer, whilst rendering the second image at the at least one second image renderer, wherein a projection of the rendered first image is to be optically combined with a projection of the rendered second image in a manner that the projection of the rendered second image substantially overlaps with the projection of the first region of the rendered first image.

In another aspect, an embodiment of the present disclosure provides a method for processing images for a display apparatus, the display apparatus comprising at least one first image renderer and at least one second image renderer, the method comprising:
  obtaining an input image from an image source;
  processing the input image to generate a first image in a manner that at least a first region of the first image is blurred with respect to a corresponding region of the input image, an intensity of the first region of the first image is reduced with respect to an intensity of the corresponding region of the input image; and
  processing the input image to generate a second image in a manner that the second image corresponds to a cropped region of the input image and an intensity of the second image is adjusted according to the intensity of the first region of the first image;

wherein the first image is to be rendered at the at least one first image renderer, whilst rendering the second image at the at least one second image renderer, and wherein a projection of the rendered first image is to be optically combined with a projection of the rendered second image in a manner that the projection of the rendered second image substantially overlaps with the projection of the first region of the rendered first image.

In yet another aspect, an embodiment of the present disclosure provides a computer program product comprising a non-transitory machine-readable data storage medium having stored thereon program instructions that, when accessed by a processing device, cause the processing device to:

obtain, from an image source, an input image;

process the input image to generate a first image in a manner that at least a first region of the first image is blurred with respect to a corresponding region of the input image, an intensity of the first region of the first image is reduced with respect to an intensity of the corresponding region of the input image; and process the input image to generate a second image in a manner that the second image corresponds to a cropped region of the input image and an intensity of the second image is adjusted according to the intensity of the first region of the first image;

wherein the processing device is communicably coupled to a display apparatus, the display apparatus comprising at least one first image renderer and at least one second image renderer, wherein the first image is to be rendered at the at least one first image renderer, whilst rendering the second image at the at least one second image renderer, and wherein a projection of the rendered first image is to be optically combined with a projection of the rendered second image in a manner that the projection of the rendered second image substantially overlaps with the projection of the first region of the rendered first image.

Embodiments of the present disclosure substantially eliminate or at least partially address the aforementioned problems in the prior art, and enable generation of images for a display apparatus, wherein such images form a foveated image upon being rendered.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
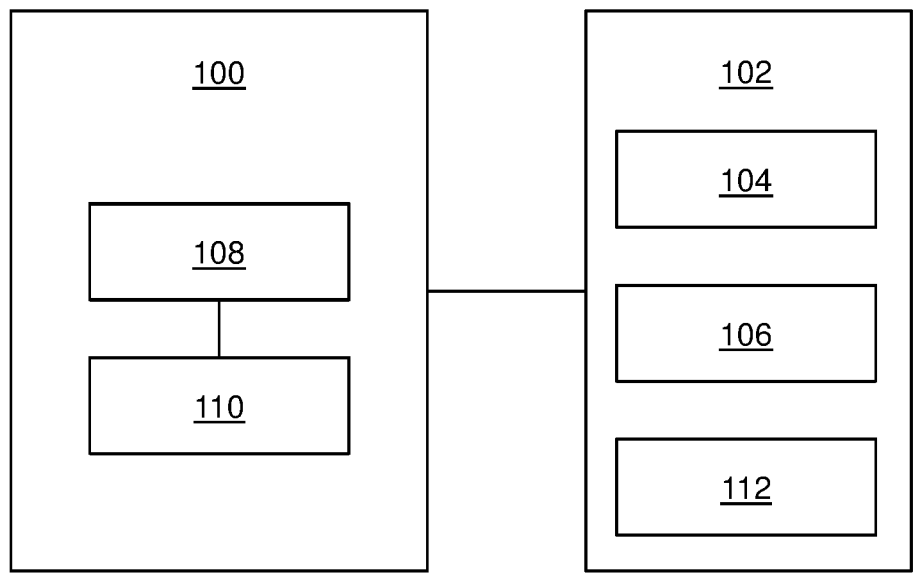
FIGS. 1 and 2 are block diagrams of different high-level architectures of a system for processing images for a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for processing images for a display apparatus, the system being at least communicably coupled to the display apparatus, the display apparatus comprising at least one first image renderer and at least one second image renderer, the system comprising an image source and at least one processor communicably coupled to the image source, wherein the image source is to be employed to produce an input image, the at least one processor being configured to:

process the input image to generate a first image in a manner that at least a first region of the first image is blurred with respect to a corresponding region of the input image, an intensity of the first region of the first image is reduced with respect to an intensity of the corresponding region of the input image; and process the input image to generate a second image in a manner that the second image corresponds to a cropped region of the input image and an intensity of the second image is adjusted according to the intensity of the first region of the first image;

wherein the at least one processor or a processor of the display apparatus is configured to render the first image at the at least one first image renderer, whilst rendering the second image at the at least one second image renderer, wherein a projection of the rendered first image is to be optically combined with a projection of the rendered second image in a manner that the projection of the rendered second image substantially overlaps with the projection of the first region of the rendered first image.

In another aspect, an embodiment of the present disclosure provides a method for processing images for a display apparatus, the display apparatus comprising at least one first image renderer and at least one second image renderer, the method comprising:

obtaining an input image from an image source;

processing the input image to generate a first image in a manner that at least a first region of the first image is blurred with respect to a corresponding region of the input image, an intensity of the first region of the first image is reduced with respect to an intensity of the corresponding region of the input image; and processing the input image to generate a second image in a manner that the second image corresponds to a cropped region of the input image and an intensity of the second image is adjusted according to the intensity of the first region of the first image;

wherein the first image is to be rendered at the at least one first image renderer, whilst rendering the second image at the at least one second image renderer, and wherein a projection of the rendered first image is to be optically combined with a projection of the rendered second image in a manner that the projection of the rendered second image substantially overlaps with the projection of the first region of the rendered first image.

In yet another aspect, an embodiment of the present disclosure provides a computer program product comprising a non-transitory machine-readable data storage medium having stored thereon program instructions that, when accessed by a processing device, cause the processing device to:

obtain, from an image source, an input image;

process the input image to generate a first image in a manner that at least a first region of the first image is blurred with respect to a corresponding region of the input image, an intensity of the first region of the first image is reduced with respect to an intensity of the corresponding region of the input image; and process the input image to generate a second image in a manner that the second image corresponds to a cropped region of the input image and an intensity of the second image is adjusted according to the intensity of the first region of the first image;

wherein the processing device is communicably coupled to a display apparatus, the display apparatus comprising at least one first image renderer and at least one second image renderer, wherein the first image is to be rendered at the at least one first image renderer, whilst rendering the second image at the at least one second image renderer, and wherein a projection of the rendered first image is to be optically combined with a projection of the rendered second image in a manner that the projection of the rendered second image substantially overlaps with the projection of the first region of the rendered first image.

The present disclosure provides the aforementioned system, method and computer program product. Beneficially, the images produced via the system can be rendered and optically combined at the display apparatus for displaying foveated images to the user of the display apparatus. Furthermore, when such foveated images are viewed by the user, their variable resolution is similar to a normal human-eye resolution. Notably, resolutions and intensities of the first image and the second image generated by the at least one processor are adjusted in a manner that an optimal foveated image is formed by optically combining such first and second images. Furthermore, the first image and the second image allow for accommodating slight misalignment during their optical combination, so that the user's experience of viewing visual scenes using the display apparatus is properly maintained even upon such slight misalignment.

Throughout the present disclosure, the term "display apparatus" refers to specialized equipment that is configured to present a simulated environment to the user when the display apparatus in operation is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, and so forth) that is operable to present a visual scene of the simulated environment to the user. The display apparatus may also commonly be referred to as "head-mounted display apparatus".

The system processes images for the display apparatus. Such images collectively constitute the visual scene of the simulated environment. In other words, the visual scene comprises a sequence of input images. In an example, the visual scene may be a virtual reality movie. In another example, the visual scene may be an educational augmented reality video. In yet another example, the visual scene may be a mixed reality game. It will be appreciated that the aforesaid system and the aforesaid method are not limited to processing only a single input image for the display apparatus, and can be employed to process the sequence of input images constituting the visual scene. In such a case, the image processing steps described herein are performed for each input image of the sequence of input images.

The system is at least communicably coupled to the display apparatus. By way of such communicable coupling, the system transmits the processed images to the display apparatus. In some implementations, the system is integrated with the display apparatus. In such implementations, the system is physically coupled to the display apparatus (for example, attached via mechanical and electrical connections to components of the display apparatus). In other implementations, the system is implemented on a remote device that is separate from the display apparatus. Optionally, the system is mounted on the remote device. Examples of the remote device include, but are not limited to, a drone and a robot. In such an instance, the remote device is physically positioned at a given real-world environment, whereas the user of the display apparatus is positioned away from (for example, at a distance from) the remote device. In such implementations, the system and the display apparatus are communicably coupled via a wired communication interface or a wireless communication interface.

Throughout the present disclosure, the term "image renderer" refers to equipment that, when operated, renders a given image. Notably, the at least one first image renderer and the at least one second image renderer, when operated, render the first image and the second image, respectively.

Optionally, the at least one first image renderer and/or the at least one second image renderer is/are implemented by way of at least one display. In such a case, the term "display" used herein refers to equipment (for example, such as a multi-layer display) configured to display the given image. Notably, the given image is displayed at an image rendering surface (for example, such as a display layer or display screen) of the at least one display. Optionally, the at least one display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Cathode Ray Tube-based display.

Optionally, the at least one first image renderer and/or the at least one second image renderer is/are implemented by way of at least one projector and a projection screen associated therewith. In such a case, the projection screen acts as an image rendering surface upon which the at least one projector projects the given image. Optionally, a single projection screen may be shared between separate projectors employed to project separate portions of the given image upon the projection screen. Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Optionally, the at least one first image renderer has a first display resolution, and is used to render the first image at the first display resolution, while the at least one second image renderer has a second display resolution, and is used to render the second image at the second display resolution. Optionally, in this regard, the first display resolution is lower than the second display resolution.

Throughout the present disclosure, the term "image source" refers to equipment that, when employed, produces the images that are to be processed. Such processed images are then utilized at the display apparatus. The image source is to be employed to produce the input image. It will be appreciated that the image source can be employed to produce a single input image, as well as a plurality of input images.

Optionally, the image source comprises at least one camera that is employed to capture an image of a given real-world scene, wherein said image is to be utilized to produce the input image. In such a case, the image of the given real-world scene could be directly utilized as the input image, or may be processed to produce the input image.

Additionally or alternatively, optionally, the image source comprises a computer that generates the input image. In an embodiment, the input image is entirely generated by the computer. In another embodiment, the computer processes the image of the given real-world scene (captured by the at least one camera) for producing the input image. For example, the computer may add computer graphics to the image of the given real-world scene for producing the input image.

Throughout the present disclosure, the phrase "producing the input image" has been used to mean any of the following:
capturing the image of the given real-world scene using the at least one camera, and using said image as the input image;
generating computer graphics using the computer, and using said computer graphics as the input image; or
capturing the image of the given real-world scene using the at least one camera and adding computer graphics to the image of the given real-world scene using the computer for producing the input image.

Optionally, the display apparatus comprises means for detecting a gaze direction of a user, wherein the at least one processor is configured to:
receive, from said means, information indicative of the detected gaze direction of the user; and
control the image source to produce the input image based upon the detected gaze direction of the user. Throughout the present disclosure, the term "means for detecting the gaze direction" refers to specialized equipment for detecting and/or following a direction of gaze of the user of the display apparatus, when the user of the display apparatus views the visual scene via the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in optical paths of the projections of the rendered first image and the rendered second image. Upon receiving the information indicative of the detected gaze direction of the user, the at least one processor controls the image source so as to produce the input image according to the gaze direction of the user. In such a case, a portion of the visual scene at with the user's gaze is focused is visually represented in the produced input image, and is subsequently displayed to the user. This allows for providing the user with a feeling of immersion within the visual scene since input images constituting the visual scene would be captured according to his/her gaze. Simply put, the at least one processor adjusts the visual scene that is to be displayed to the user, by producing the input image according to the gaze direction of the user.

Optionally, the image source comprises the at least one camera, the system further comprising at least one actuator for adjusting an orientation of the at least one camera, wherein the at least one processor is configured to control the at least one actuator to adjust the orientation of the at least one camera based upon the detected gaze direction of the user. Notably, the orientation of the at least one camera is adjusted in the aforesaid manner in order to produce the input image according to the gaze direction of the user. Specifically, by adjusting the orientation of the at least one camera, a perspective and/or a field of view of the at least one camera is adjusted such that the input image captured by the at least one camera depicts the portion of the visual scene at with the user's gaze is focused. Throughout the present disclosure, the term "actuator" refers to equipment (for example, such as electrical components, mechanical components, magnetic components, polymeric components, and so forth) that is employable to adjust the orientation of the at least one camera. Notably, the at least one actuator, in operation, adjusts the orientation of the at least one camera by way of an actuation signal. It will be appreciated that the actuation signal could be a mechanical torque, an electric current, hydraulic pressure, pneumatic pressure, and the like. Furthermore, optionally, the at least one actuator is employed to tilt, rotate and/or translate the at least one camera based upon the detected gaze direction of the user.

Optionally, the display apparatus comprises means for tracking a head orientation of a user, wherein the at least one processor is configured to:
receive, from said means, information indicative of the head orientation of the user; and
control the image source to produce the input image based upon the head orientation of the user. Throughout, the present disclosure, the term "means for tracking a head orientation" refers to specialized equipment for detecting and following the orientation of the user's head, when the display apparatus is worn by the user. It will be appreciated that the head orientation of the user may be straight, sideways, upwards, downwards, or any combination thereof. At a given instant of time, information indicative of a current head orientation of the user is communicated from the display apparatus to the at least one processor. The at least one processor then utilizes such information to control the image source to produce the input image from a perspective of the current head orientation of the user. By controlling the image source in the aforesaid manner, the at least one processor allows for adjusting the visual scene that is to be displayed to the user, by way of producing the input image according to the head orientation of the user. When such perspective-correct input images (that are produced by the image source) are subsequently displayed to the user via the display apparatus, the user feels a sense of immersion and realism within the visual scene. Examples of the means for tracking the head orientation of the user include, but are not limited to, a gyroscope, and an accelerometer.

Optionally, the image source comprises at least one camera, the system further comprising at least one actuator for adjusting an orientation of the at least one camera, wherein the at least one processor is configured to control the at least one actuator to adjust the orientation of the at least one camera based upon the head orientation of the user. Notably, the at least one actuator adjusts the orientation of the at least one camera (for example, by way of rotating, tilting, and the like) to be similar to the head orientation of the user. As a result, the at least one camera is correctly oriented to capture the input image from the same perspective as that of the user's head.

Throughout the present disclosure, the term "processor" refers to hardware, software, firmware or a combination of these. The at least one processor of the system controls operation of the system. The at least one processor is communicably coupled to the image source. When the image source comprises the at least one camera, and the at least one camera is mounted on the remote device, the at least one processor may or may not be physically coupled to the at least one camera. When the image source comprises the computer, the at least one processor may or may not be physically coupled to the computer. When the image source comprises the at least one camera and the computer, the at least one processor may or may not be physically coupled to the image source.

The at least one processor is configured to process the input image to generate the first image. Throughout the present disclosure, the term "first image" refers to a low-resolution representation of the input image. In other words, the resolution of the first image is lower than a resolution of the input image.

Notably, at least the first region of the first image is blurred with respect to a corresponding region of the input image. In other words, the first region of the first image appears to have lesser visual detail as compared to the corresponding region of the input image. The first region of the first image appears softer with respect to the corresponding region of the input image. In some implementations, only the first region of the first image is blurred with respect to the corresponding region of the input image, whereas in other implementations, at least one second region of the first image is also blurred with respect to at least one corresponding region of the input image.

Furthermore, the intensity of the first region of the first image is reduced with respect to the intensity of the corresponding region of the input image. In other words, an intensity of a given pixel of the first region of the first image is less than or equal to an intensity of a corresponding pixel of the input image. The first region of the first image appears darker as compared to the corresponding region of the input image.

According to an embodiment, when processing the input image to generate the first image, the at least one processor is configured to:
scaling down the input image to generate a semi-processed image, based upon a resolution of the input image and a resolution to be achieved for the first image;
apply a blur filter to pixel values of a first region of the semi-processed image to generate a blurred image, wherein the first region of the semi-processed image corresponds to the first region of the first image; and
apply a darkening effect to pixel values of a first region of the blurred image to generate the first image, wherein the first region of the blurred image corresponds to the first region of the first image. In such a case, the input image is scaled down to a desired resolution (namely, the resolution to be achieved for the first image), and then the blur filter and the darkening effect are applied in a manner that only the first region of the first image that is supposed to optically overlap with the second image appears blurred and darkened.

Throughout the present disclosure, the term "semi-processed image" refers to an intermediary image that is generated whilst processing the input image to generate the first image. Notably, a resolution of the semi-processed image is same as the resolution to be achieved for the first image. The resolution to be achieved for the first image depends on the first display resolution of the at least one first image renderer. Since the semi-processed image is a scaled-down version of the input image, the semi-processed image has lesser visual detail as compared to the input image. The first region of the semi-processed image corresponds to the first region of the first image whereas a remaining region of the semi-processed image corresponds to a remaining region of the first image. It will be appreciated that the semi-processed image represents the same visual information as the input image, albeit at a lower resolution than the input image. The input image is scaled down to generate the semi-processed image by way of at least one image processing algorithm (for example, such as mipmapping, box sampling, Lanczos resampling, sinc resampling, and the like). Such image processing algorithms are well-known in the art.

Throughout the present disclosure, the term "pixel value" of a given pixel refers to an intensity of the given pixel. Notably, the term "pixel value" has been used to mean any of the following:
an intensity of the given pixel, when the given image is a pixel of a grayscale image; or
an intensity of a colour of the given pixel, when the given image is a pixel of a coloured image.

Throughout the present disclosure, the term "blurred image" refers to another intermediary image that is generated whilst processing the input image to generate the first image. Notably, the blur filter is optionally applied to the pixel values of all pixels in the first region of the semi-processed image to generate the blurred image. Since the first region of the semi-processed image corresponds to the first region of the first image, the first region of the first image would be blurred when the blurred image is used to generate the first image. It will be appreciated that the blur filter is applied to the pixel values of the first region of the semi-processed image since the first region of the first image is required to be blurred with respect to the corresponding region of the input image.

Furthermore, optionally, the darkening effect is applied to the pixel values of all pixels in the first region of the blurred image to generate the first image. Notably, the first region of the blurred image corresponds to the first region of the first image, and also corresponds to the first region of the semi-processed image (upon which the blur filter is applied). Since the first region of the blurred image corresponds to the first region of the first image, the first region of the first image would be darkened (in addition to being blurred as described hereinabove) when the first image is generated using the blurred image upon which the darkening effect is applied. In other words, the intensity of the first region of the first image would be reduced with respect to the intensity of the first region of the input image as the first image is generated using the aforesaid darkened blurred image.

Optionally, an extent to which the input image is to be scaled down to generate the semi-processed image is proportional to a factor by which the resolution of the input image is greater than the resolution to be achieved for the first image. As an example, when the input image has a size of 16000*16000 pixels and the first display resolution of the at least one first image renderer is 2000*2000 pixels, the resolution to be achieved for the first image is also 2000*2000 pixels. In such a case, the resolution of the input image is four times the resolution to be achieved for the first image. In such an example, three mipmaps M1, M2 and M3 may be generated for the input image, wherein the mipmap M1 generates a semi-processed image having 8000*8000 pixels, the mipmap M2 generates a semi-processed image having 4000*4000 pixels and the mipmap M3 generates a semi-processed image having 2000*2000 pixels. Therefore, the semi-processed image of the mipmap M3 is used by the at least one processor whilst processing the input image to generate the first image.

Optionally, the blur filter is implemented by way of at least one of: a spatial low pass filter, a spatial band pass filter, a pyramidal filter. Optionally, the blur filter is a linear finite impulse response filter. Alternatively, optionally, the blur filter is a non-linear infinite impulse response filter.

As an example, the blur filter may be implemented by way of a spatial low pass filter. In such an example, a 3*3 pixel kernel (namely, a 3*3 pixel kernel mask) may be convolved with the pixel values of the first region of the semi-processed image, in a pixel by pixel manner. The pixel values of the first region of the semi-processed image are convolved with coefficients in the 3*3 pixel kernel, the 3*3 pixel kernel is shifted by one pixel, the pixel values of the first region of the semi-processed image are again convolved with the coefficients in the 3*3 pixel kernel, the 3*3 pixel kernel is again shifted by one pixel, and so on. Notably, frequency domain characteristics of the first region of the semi-processed image are defined by coefficients in the 3*3 pixel kernel.

Optionally, the blur filter is applied recursively to the pixel values of the first region of the semi-processed image, until a required blur effect is achieved in the blurred image. In other words, the blur filter is applied recursively, for a given number of times, until the required blur effect is achieved in the blurred image. As an example, the blur filter may be applied thrice recursively to the pixel values of the first region of the semi-processed image to achieve the required blur effect in the blurred image.

Optionally, the darkening effect is applied to a given pixel of the first region of the blurred image by way of at least one of: scaling down an intensity of the given pixel, determining an average of pixel values of a plurality of neighbouring pixels surrounding the given pixel and applying the average pixel value to the given pixel, determining a reduced pixel value of the given pixel from a mipmap of the blurred image and applying the reduced pixel value to the given pixel.

In one example, the given pixel may be darkened by scaling down the intensity of the given pixel by multiplying an intensity of the given pixel with a number lesser than one. In such a case, given an initial intensity of the given pixel as X, the initial intensity of the given pixel may be multiplied, for example, by 0.5 to give a resultant intensity of the given pixel as 0.5*X. Clearly, since the resultant intensity is lesser than the initial intensity, the darkening effect is applied to the given pixel.

In another example, the given pixel of the first region of the blurred image may have an intensity equal to Y whereas its neighbouring pixels may have an intensity equal to 0. A first level mipmap of the blurred image may yield a first pixel that is twice as large as the given pixel, the first pixel having an intensity equal to 0.5*Y. A second level mipmap of the blurred image may yield a second pixel that is twice as large as the first pixel, the second pixel having an intensity equal to 0.25*Y, and so on. The intensity values of the first pixel or the second pixel are the reduced pixel values of the given pixel and can be applied to the given pixel to apply the darkening effect to the given pixel.

According to another embodiment, when processing the input image to generate the first image, the at least one processor is configured to:

scaling down the input image to generate a semi-processed image, based upon a resolution of the input image and a resolution to be achieved for the first image;

apply a darkening effect to pixel values of a first region of the semi-processed image to generate a darkened image, wherein the first region of the semi-processed image corresponds to the first region of the first image; and apply a blur filter to pixel values of a first region of the darkened image to generate the first image, wherein the first region of the darkened image corresponds to the first region of the first image. In such a case, the input image is scaled down to a desired resolution (namely, the resolution to be achieved for the first image), and then the darkening effect and the blur filter are applied in a manner that only the first region of the first image that is supposed to optically overlap with the second image appears darkened and blurred.

Optionally, the darkening effect is applied to the pixel values of all pixels in the first region of the semi-processed image to generate the darkened image. Throughout the present disclosure, the term "darkened image" refers to yet another intermediary image that is generated whilst processing the input image to generate the first image. Notably, the first region of the semi-processed image corresponds to the first region of the first image. As a result, the first region of the first image would be darkened when the first image is generated using the darkened image. In other words, the intensity of the first region of the first image would be reduced with respect to the intensity of the first region of the input image when the first image is generated using the darkened image.

Optionally, the darkening effect is applied to a given pixel of the first region of the semi-processed image by way of at least one of: scaling down an intensity of the given pixel, determining an average of pixel values of a plurality of neighbouring pixels surrounding the given pixel and applying the average pixel value to the given pixel, determining a reduced pixel value of the given pixel from a mipmap of the semi-processed image and applying the reduced pixel value to the given pixel.

Furthermore, optionally, the blur filter is applied to the pixel values of all pixels in the first region of the darkened image to generate the first image. Since the first region of the darkened image corresponds to the first region of the first image, the first region of the first image would be blurred (in addition to being darkened as described hereinabove) when the darkened image upon which the blur filter is applied is used to generate the first image. It will be appreciated that the blur filter is applied to the pixel values of the first region of the darkened image since the first region of the first image is required to be blurred with respect to the corresponding region of the input image.

Optionally, the blur filter is applied recursively to the pixel values of the first region of the darkened image, until a required blur effect is achieved in the first image. In other words, the blur filter is applied recursively, for a given number of times, until the required blur effect is achieved in the first image. As an example, the blur filter may be applied twice recursively to the pixel values of the first region of the darkened image to achieve the required blur effect in the first image.

According to yet another embodiment, when processing the input image to generate the first image, the at least one processor is configured to generate the first region of the first image by:

(a) selecting an array of pixels comprising a given pixel of the input image and a plurality of neighbouring pixels of the given pixel;
(b) discarding a pixel value of at least one pixel of said array that is brighter than remaining pixels of said array; and
(c) determining a pixel value of a given pixel of the first image or an intermediate image by calculating an average of pixel values of the remaining pixels. Notably, such an embodiment pertains to a non-linear image processing technique by way of which the first region of the first image is generated in a manner that the first region of the first image is both blurred and has lesser intensity with respect to the corresponding region of the input image. Throughout the present disclosure, the term "neighbouring pixel" of a given pixel refers to a pixel that is adjacent to the given pixel. The operation (b) allows for ensuring that the pixel value of brightest pixel(s) of said array are excluded prior to determining the pixel value of the given pixel of the first image or the intermediate image at (c). The remaining pixels of said array include relatively darker pixels (with respect to the at least one pixel of said array that is discarded at (b)). As a result, the determined pixel value of the given pixel of the first image at (c) changes from an original pixel value of the given pixel of the input image. Moreover, since the average of pixel values of the remaining pixels is determined as the pixel value of the given pixel at (c), the first image is also blurred. It will be appreciated that the aforesaid operations (a) to (c) are performed for all pixels in the region of the input image that correspond to the first region of the first image.

Optionally, when processing the input image to generate the first image, the at least one processor is configured to perform aforesaid operations (a) to (c) recursively, until the required blurring and the required darkening effect are achieved for the first region of the first image.

Throughout the present disclosure, the term "intermediate image" refers to still another intermediary image that is generated whilst processing the input image to generate the first image. In some implementations, the input image is processed to generate the first image without generation of any intermediate image. In such implementations, the first region of the first image generated by a single instance of performing the operations (a) to (c) is both darkened as well as blurred with respect to the corresponding region of the input image. In other implementations, the input image is processed to generate the first image via generation of a single intermediate image. In such implementations, the operations (a) to (c) are performed recursively twice. In the first recursive iteration, the single intermediate image is generated using the input image. In the second recursive iteration, the first region of the first image is generated using the single intermediate image in a manner that said region of the first image is both darkened as well as blurred with respect to the corresponding region of the input image. In still other implementations, the input image is processed to generate the first image via generation of a plurality of intermediate images. In such implementations, the operations (a) to (c) are performed recursively until the first region of the first image is generated in a manner that said region of the first image is both darkened as well as blurred with respect to the corresponding region of the input image.

In an example, the array of pixels selected at (a) may be a 2*2 array of pixels comprising the given pixel of the input image and 3 neighbouring pixels of the given pixel. The four pixels in the array may have pixel values A, 0.5*A, 0.6*A and 0.1*A, the given pixel having the pixel value equal to 0.6*A. At (b), a pixel value of the brightest pixel among the array of four pixels may be discarded. In such an example, the pixel value 'A' may be discarded. Thereafter, at (c), the pixel value of the given pixel of the first image or the intermediate image may be determined by calculating the average of pixel values of the remaining pixels. In such an example, the pixel value of the given pixel of the first image or the intermediate image may be determined to be equal to 0.4*A (upon calculating the average of the pixel values 0.5*A, 0.6*A and 0.1*A).

Optionally, when processing the input image to generate the first image, the at least one processor is configured to perform aforesaid operations (a) to (c) recursively, based upon a resolution of the input image and a resolution to be achieved for the first image. In other words, the aforesaid operations (a) to (c) are performed recursively until the required resolution for the first image is achieved. In some implementations, the operations (a) to (c) are performed only once, and the input image is processed to generate the first image without generation of any intermediate image. In other implementations, the operations (a) to (c) are performed for a plurality of recursive iterations, wherein at each recursive iteration, a new intermediate image is generated. In such implementations, the first image is generated upon completion of a final (namely, last) recursive iteration of the plurality of recursive iterations. In an example, when processing the input image to generate the first image, the at least one processor is configured to generate the first region of the first image by:

selecting an array of pixels comprising a given pixel of the intermediate image and a plurality of neighbouring pixels of the given pixel;
discarding a pixel value of at least one pixel of said array that is brighter than remaining pixels of said array; and
determining a pixel value of a given pixel of the first image or a subsequent intermediate image by calculating an average of pixel values of the remaining pixels.

According to still another embodiment, when processing the input image to generate the first image, the at least one processor is configured to generate the first region of the first image by:

(i) selecting a plurality of neighbouring pixels surrounding a given pixel of the input image;

(ii) determining an average pixel value by calculating an average of pixel values of the plurality of neighbouring pixels; and (iii) determining a pixel value of a given pixel of the first image or an intermediate image by selecting a minimum value out of an original pixel value of the given pixel of the input image and the average pixel value. Notably, such an embodiment pertains to another non-linear image processing technique by way of which the first region of the first image is generated in a manner that the first region of the first image is both blurred and has lesser intensity with respect to the corresponding region of the input image. Determining the average pixel value at (ii) allows for blurring the first region of the first image by implementing a blur effect on the given pixel of the input image. The manner of determining the pixel value of the given pixel of the first image or the intermediate image at (iii) allows for darkening the first region of the first image with respect to the corresponding region of the input image since a lower value (namely, a lower intensity value) is selected amongst the original pixel value of the given pixel of the input image and the average pixel value determined at (ii). It will be appreciated that the aforesaid operations (i) to (iii) are performed for all pixels in the region of the input image that correspond to the first region of the first image.

Optionally, when processing the input image to generate the first image, the at least one processor is configured to perform aforesaid operations (i) to (iii) recursively, until the required blurring and the required darkening effect are achieved for the first region of the first image.

In an example, 3 neighbouring pixels surrounding the given pixel of the input image may be selected at (i). The 3 neighbouring pixels may have pixel values B, 0.7*B and 0.1*B whereas the given pixel of the input image has a pixel value equal to 0.3*B. At (ii), an average pixel value is determined by calculating an average of pixel values of the plurality of neighbouring pixels. In such an example, the average pixel value may be 0.6*B (upon calculating the average of the pixel values B, 0.7*B and 0.1*B). Thereafter, at (iii), the pixel value of the given pixel of the first image or the intermediate image is determined by selecting the minimum value out of the original pixel value of the given pixel of the input image (namely, 0.3*B) and the determined average pixel value (namely, 0.6*B). In such an example, the pixel value of the given pixel of the first image or the intermediate image is determined to be 0.3*B.

Optionally, when processing the input image to generate the first image, the at least one processor is configured to perform aforesaid operations (i) to (iii) recursively, based upon a resolution of the input image and a resolution to be achieved for the first image. In other words, the aforesaid operations (i) to (iii) are performed recursively until the required resolution for the first image is achieved. In some implementations, the operations (i) to (iii) are performed only once, and the input image is processed to generate the first image without generation of any intermediate image. In other implementations, the operations (i) to (iii) are performed for a plurality of recursive iterations, wherein at each recursive iteration, a given intermediate image is generated. In such implementations, the first image is generated upon completion of a final (namely, last) recursive iteration of the plurality of recursive iterations. In an example, when processing the input image to generate the first image, the at least one processor is configured to generate the first region of the first image by:

selecting a plurality of neighbouring pixels surrounding a given pixel of the intermediate image;

determining an average pixel value by calculating an average of pixel values of the plurality of neighbouring pixels; and determining a pixel value of a given pixel of the first image or a subsequent intermediate image by selecting a minimum value out of an original pixel value of the given pixel of the intermediate image and the average pixel value.

Optionally, the average is a weighted average. In such a case, given a set of pixels for which the average of pixel values is to be calculated, some pixel values of the set contribute more towards the average than other pixel values of the set. As an example, determining a pixel value of a given pixel by calculating the weighted average of a given group of pixels may allow for implementing a Gaussian blur effect for the given pixel.

Alternatively, optionally, the average is a non-weighted average. In such a case, given a set of pixels for which the average of pixel values is to be calculated, all pixel values of the set contribute equally towards the average. As an example, determining a pixel value of a given pixel by calculating the non-weighted average of a given group of pixels may allow for implementing a Box blur effect for the given pixel.

The at least one processor is configured to process the input image to generate the second image. Throughout the present disclosure, the term "second image" refers to a region of the input image that is cropped from the input image. In other words, the second image corresponds to a cropped region of the input image. Notably, the second image has the same resolution as the input image since the second image is extracted (namely, snipped) from the input image. It will be appreciated that the resolution of the second image is higher than the resolution of the first image since the first image is the low-resolution representation of the input image whereas the second image has the same resolution as the input image.

Furthermore, the second image corresponds to the same region of the input image as the first region of the first image. In other words, the cropped region of the input image (which corresponds to the second image) is same as the region of the input image which corresponds to the first region of the first image.

The intensity of the second image is adjusted according to the intensity of the first region of the first image. As described earlier, the first region of the first image has a lesser intensity as compared to the corresponding region of the input image. Moreover, since the second image also corresponds to the same region of the input image as the first region of the first image, the intensity of the second image is required to be adjusted in a manner that upon overlapping of the projections of the rendered second image and the first region of the rendered first image, the corresponding region of the input image appears to have its original intensity.

Optionally, when processing the input image to generate the second image, the at least one processor is configured to calculate pixel values of the second image in a manner that a sum of a pixel value of a given pixel of the second image and a pixel value of a corresponding pixel of the first region of the first image lies within a given threshold from an original pixel value of a corresponding pixel of the input image, wherein a projection of the given pixel of the rendered second image is to be optically combined with a projection of the corresponding pixel of the first region of the rendered first image. In other words, the pixel value of a given pixel of the second image is to lie within the given threshold from a difference between the original pixel value of the corresponding pixel of the input image and the pixel value of the corresponding pixel of the first region of the first image. Upon the aforesaid optical combination, the pixel value of the given pixel of the second image and the pixel value of the corresponding pixel of the first region of the first image are additively combined to achieve a resultant pixel value. Such a resultant pixel value is to lie within the given threshold from the original pixel value of the corresponding pixel of the input image in order to accurately replicate the original pixel value of the corresponding pixel of the input image upon the optical combination of the projections of the rendered second image and the first region of the rendered first image.

Optionally, the given threshold is +/−10% of the original pixel value of the corresponding pixel of the input image. In other words, optionally, the sum of the pixel value of the given pixel of the second image and the pixel value of the corresponding pixel of the first region of the first image is to lie within −10% of the original pixel value of the corresponding pixel of the input image and +10% of the original pixel value of the corresponding pixel of the input image. In an example, when the original pixel value of the corresponding pixel of the input image is M, the sum of the pixel value of the given pixel of the second image and the pixel value of the corresponding pixel of the first region of the first image would lie within 0.9*M and 1.1*M. The sum of the pixel value of the given pixel of the second image and the pixel value of the corresponding pixel of the first region of the first image may be, for example, equal to 0.9*M, 0.95*M, M, 1.05*M or 1.1*M.

It will be appreciated that since the resolution of the first image is lower than the resolution of the second image, for any given pixel of the first image, there would always be a plurality of corresponding pixels of the second image. Optionally, the at least one processor is configured to:
   determine a plurality of pixels of the second image that correspond to a given first pixel of the first image; and
   determine an intensity of a given second pixel from amongst the plurality of pixels of the second image based upon an intensity of a corresponding pixel of the input image and an intensity of the given first pixel of the first image, wherein the intensity of the given second pixel is to lie within a given threshold from a difference between the intensity of the corresponding pixel of the input image and the intensity of the given first pixel of the first image. Optionally, in this regard, the given threshold is +/−10% of the difference between the intensity of the corresponding pixel of the input image and the intensity of the given first pixel of the first image.

In an example, the resolutions of the first image and the second image may be such that a single pixel of the first image corresponds to nine pixels of the second image. In such a case, the single pixel of the first image also corresponds to nine pixels of the input image. Notably, pixel values of each of the nine pixels of the second image may be calculated in a manner that a sum of a pixel value of a given pixel of the second image and a pixel value of the single pixel of the first image lies within the given threshold from an original pixel value of a corresponding pixel of the input image. In other words, the pixel values of each of the nine pixels of the second image may be calculated by subtracting the pixel value of the single pixel of the first image from a pixel value of a corresponding pixel among the nine pixels of the input image. For example, the original pixel values of all the nine pixels of the input image may be equal to Z. When such an input image is processed to generate the first image, the pixel value of the single pixel of the first image may be 0.7*Z. In such a case, the pixel values of each of the nine pixels of the second image may be calculated by subtracting the pixel value of the single pixel of the first image (namely, the value 0.7*Z) from the pixel value of the corresponding pixel among the nine pixels of the input image (namely, the value Z). As a result, the pixel values of all the nine pixels of the second image may be determined to be 0.3*Z.

It will be appreciated that when a second image having low pixel values is rendered at the at least one second image renderer, a lifetime of the at least one second image renderer may be prolonged. For example, when the at least one second image renderer is implemented by way of the at least one Organic LED (OLED)-based display and the second image having low pixel values is to be rendered at the at least one second image renderer, a lifetime of the at least one second image renderer is prolonged since pixels of the at least one Organic LED (OLED)-based display generally wear out as a function of a required brightness of said display and time.

Optionally, the at least one processor is configured to generate the first and second images in a manner that a first transition area within the first region of the first image fades on going from an outer periphery of the first transition area towards an inner periphery of the first transition area, while a second transition area within the second image fades on going from an inner periphery of the second transition area towards an outer periphery of the second transition area, wherein a projection of the first transition area is to substantially overlap with a projection of the second transition area when the first and second images are rendered. Such a manner of fading the first transition area within the first region of the first image and the second transition area within the second image allows for reducing screen door effect upon overlapping of the projections of the first transition area and the second transition area. Furthermore, the aforesaid manner of fading the first transition area and the second transition area allows for smooth and gradual blending of the projection of the first transition area with the projection of the second transition area when the first and second images are rendered. Image processing techniques for fading the first transition area and the second transition area are well-known in the art. Hereinabove, by "substantially overlap", it is meant that a misalignment between corresponding pixels of the first transition area and the pixels of the second transition area lies within a range of 0 to 10 pixels, and more optionally, within a range of 0 to 5 pixels.

Throughout the present disclosure, the term "first transition area" refers to a region of the first image having a variable brightness, wherein the brightness of the first image reduces on going from the outer periphery of the first transition area towards the inner periphery of the first transition area. Notably, a region of the first image that is surrounded by the inner periphery of the first transition area has lower brightness as compared to a region of the first image that lies outside the outer periphery of the first transition area. In other words, the region of the first image that lies outside the outer periphery of the first transition area has maximum (and optionally, uniform) brightness, the first transition area has variable brightness, and the region of the first image that is surrounded by the inner periphery of the first transition area has minimum (and optionally, uniform) brightness. It will be appreciated that the first transition area is an intermediate region that lies between the aforesaid two regions of the first image. Optionally, the first region of the first image corresponds to the first transition area and the region of the first image that is surrounded by the inner periphery of the first transition area.

Throughout the present disclosure, the term "second transition area" refers to a region of the second image having a variable brightness, wherein the brightness of the second image reduces on going from the inner periphery of the second transition area towards the outer periphery of the second transition area. Optionally, the second transition area is present along a boundary of the second image. Furthermore, a region of the second image that is surrounded by the inner periphery of the second transition area has maximum (and optionally, uniform) brightness. When the at least one processor optionally implements fading in the aforesaid manner, the first image and the second image appear to seamlessly merge into each other, upon being rendered. As a result, the user views a single image of the visual scene, when the first and second images are rendered via the display apparatus. Such an image has a substantially uniform brightness and a variable resolution (since the first image has lower resolution than the second image).

Optionally, a width of the first transition area corresponds to 1% to 10% of a width of the first image. More optionally, the width of the first transition area corresponds to 5% to 10% of the width of the first image. For example, given that the width of the first image is W1 millimetres, the width of the first transition area could be 0.01*W1, 0.02*W1, 0.03*W1, 0.04*W1, 0.05*W1, 0.06*W1, 0.07*W1, 0.08*W1, 0.09*W1 or 0.1*W1 millimetres. Similarly, optionally, a width of the second transition area corresponds to 1% to 10% of a width of the second image. More optionally, the width of the second transition area corresponds to 5% to 10% of the width of the second image. For example, given that the width of the second image is W2 millimetres, the width of the second transition area could be 0.01*W2, 0.02*W2, 0.03*W2, 0.04*W2, 0.05*W2, 0.06*W2, 0.07*W2, 0.08*W2, 0.09*W2 or 0.1*W2 millimetres.

Optionally, the width of the first transition area is equal to the width of the second transition area. Alternatively, optionally, the width of the first transition area and the width of the second transition area are unequal.

In an example, the first image may have a width equal to 5 centimetres (or 50 millimetres). In such a case, the width of the first transition area may be 1 millimeter (corresponding to 2% of the width of the second image). In such an example, the second image may have a width equal to 2 centimetres (or 20 millimetres). In such a case, the width of the second transition area may be 1 millimeter (corresponding to 5% of the width of the second image).

Optionally, the at least one processor is configured to generate the first and second images based upon scene information pertaining to the input image, wherein the scene information comprises information pertaining to at least one of: a type of visual scene being presented by the input image, a texture of at least one object present in the visual scene or at least a portion of the at least one object, a material category of at least one object present in the visual scene or at least a portion of the at least one object. Notably, the input image depicts various objects and/or features which generally have specific characteristics associated therewith. Information pertaining to such characteristics constitutes the "scene information" of the input image. Examples of such characteristics include, but are not limited to, visual characteristics, material composition, audio characteristics, haptic characteristics, and physical interaction characteristics. The scene information pertaining to the input image could be either extracted by the at least one processor or be obtained from the image source. As an example, when the image source comprises the computer, the scene information may be provided along with the input image. The term "type of visual scene" refers to a nature of the visual scene depicted in the input image. As an example, the type of visual scene may be "indoor environment" (for example, when the input image depicts a room of a house), "outdoor environment" (for example, when the input image depicts a beach, a park, and the like), "computer graphics" (for example, when the input image depicts a virtual reality tutorial), and so forth. Next, the "texture of at least one object present in the visual scene or at least a portion of the at least one object" may be a smooth texture, a rough texture, a texture having high spatial frequencies, a texture having low spatial frequencies, and so forth. Next, the "material category of the at least one object present in the visual scene or at least a portion of the at least one object" refers to a type of material that the at least one object could be made of. Notably, the at least one object could be made of a single material or a plurality of materials. In an instance when the at least one object is made of the plurality of materials, different portions of the at least one object could be made of different materials. Examples of the material categories include, but are not limited to, fabric, stone, metal, wood, foliage, plastic, glass, brick, water, leather, painted and tile.

Optionally, the at least one processor is configured to analyze an image content of the input image to determine the scene information pertaining to the input image. In such a case, the at least one processor analyses the image content of the input images to extract the scene information pertaining to the input image. Such analysis of the image content of the input image allows for the at least one processor to correctly implement image processing operations whilst generating the first image and the second image. In order to do so, the at least one processor could employ a parameterized model or machine learning. The parameterized model optionally comprises a plurality of parameters which are analysed to determine image processing parameters for generating the first image and the second image. Alternatively, the machine learning approach pertains to training the at least one processor by utilizing a test selection of input images and user feedback pertaining to appearance of the test selection of input images upon being rendered, for analyzing the image content of the input image. For example, on the basis of the analysis of the image content of the input image, the at least one processor may adjust the size of the pixel kernel whilst applying the blur filter, adjust an extent to which the darkening effect is to be applied, and the like. As an example, upon analyzing the image content of the input image, the at least one processor may determine that the input image depicts clear skies (which is an outdoor environment having no texture or edges). In such a case, the at least one processor may process the input image to generate only the first image and render only the first image at the at least one first image renderer.

Optionally, such an analysis is performed only when the image source comprises the at least one camera. Optionally, the at least one processor employs at least one image processing algorithm to analyse the image content of the input image. Examples of such at least one image processing algorithm include, but are not limited to, a pattern recognition algorithm, an edge detection algorithm, a computer vision algorithm (for example, such as Simultaneous Localization and Mapping (SLAM) algorithm, Structure from Motion (SfM) algorithm, Scale-Invariant Feature Transform (SIFT), Speeded-Up Robust Features (SURF) algorithm, and the like) and an artificial intelligence algorithm (for example, such as a deep learning algorithm for training at least one neural network).

Additionally, optionally, the at least one processor compares the image content of the input image with an image content of at least one previous input image to detect movement of the at least one object in the visual scene.

The at least one processor or the processor of the display apparatus is configured to render the first image at the at least one first image renderer, whilst rendering the second image at the at least one second image renderer, wherein a projection of the rendered first image is to be optically combined with a projection of the rendered second image in a manner that the projection of the rendered second image substantially overlaps with the projection of the first region of the rendered first image. When a given image is rendered at a given image renderer, a projection of the given image emanates from the given image renderer. Notably, the projection of the rendered first image is optically combined with the projection of the rendered second image to form a combined projection. When the combined projection is incident upon the user's eyes, the user views the single image of the visual scene, instead of two separate images. As mentioned previously, the same region of the input image is represented in the second image and the first region of the first image, at different resolutions. Specifically, such a region of the input image is represented at a higher resolution in the second image as compared to the first region of the first image. Therefore, in order to avoid optical distortion of said region of the input image, the projection of the rendered second image substantially overlaps with the projection of the first region of the rendered first image. Moreover, the projections of the rendered second image and the first region of the rendered first image are additively combined in a manner that the corresponding region of the input image appears to have its original intensity. Hereinabove, by "substantially overlaps", it is meant that a misalignment between corresponding pixels of the second image and the pixels of the first region of the first image lies within a range of 0 to 10 pixels, and more optionally, within a range of 0 to 5 pixels.

It will be appreciated that the input image that is visible to the user has variable resolution and therefore, emulates foveation characteristics of the human visual system. To the user, the input image appears to have a higher resolution in a region that corresponds to the optically overlapped second image and the first region of the first image whilst having a relatively lower resolution in a remaining region of the input image. As a result, the user's experience of viewing the input image is considerably enhanced.

Throughout the present disclosure, the term "projection" of the given image refers to a collection of light rays emanating from the given image, when the given image is rendered by the at least one image renderer. The projection of the given image (namely, the collection of light rays) may transmit through and/or reflect from various components of the display apparatus before reaching the user's eyes. For purposes of embodiments of the present disclosure, the term "projection of the given image" has been used consistently, irrespective of whether the collection of light rays is transmitted and/or reflected.

Optionally, the at least one processor or the processor of the display apparatus renders the first image and the second image substantially simultaneously. Notably, rendering the first and second images substantially simultaneously allows for rendering the input image as a whole, in a manner that the user views the complete input image, rather than two separate images. By "substantially simultaneously", it is meant that a time instant of rendering the first image and a time instant of rendering the second image lie within 200 milliseconds of each other, and more optionally, within 20 milliseconds of each other.

In some implementations, the at least one processor is configured to render the first image at the at least one first image renderer, whilst rendering the second image at the at least one second image renderer. In other implementations, the processor of the display apparatus is configured to render the first image at the at least one first image renderer, whilst rendering the second image at the at least one second image renderer.

Optionally, the display apparatus comprises means for detecting a gaze direction of a user, wherein the at least one processor is configured to:
  receive, from said means, information indicative of the detected gaze direction of the user;
  determine a region of interest of the input image based upon the detected gaze direction of the user; and
  process the input image to generate the first image and the second image, based upon the region of interest of the input image, wherein the second image and the first region of the first image substantially correspond to the region of interest of the input image. The term "region of interest" refers to a region of the input image whereat the gaze direction of the user is directed (namely, focused) when the user views the input image. In other words, the region of interest is a fixation region within the input image. When the gaze direction of the user is focused upon the region of interest, the region of interest is directed onto the fovea of the user's eyes, and is resolved to a much greater detail as compared to the remaining region(s) of the input image. Therefore, the input image is processed to generate the first image and the second image in a manner that the region of interest is depicted by way of the high resolution second image. Correspondingly, the first region of the first image (upon which the second image is to be optically overlapped) also depicts the region of interest. Furthermore, since the gaze direction of the user generally changes whilst viewing the visual scene, for every input image of the visual scene, the first and second images are beneficially generated in the aforesaid manner to allow for depicting the region of interest in high resolution (namely, with fine visual detail) at all times. Such dynamic processing of the input image according to the gaze direction of the user allows for generating gaze contingent first and second images from the input image. When such gaze contingent first and second images are rendered at the at least one first image renderer and the at least one second image renderer, respectively, active foveation is implemented within the display apparatus.

Hereinabove, the phrase "the second image and the first region of the first image substantially correspond to the region of interest of the input image" is used to mean that the second image and the first region of the first image correspond to at least 80 percent of the region of interest of the input image; more optionally, to at least 90 percent of the region of interest of the input image; and yet more optionally, to at least 95 percent of the region of interest of the input image.

Optionally, the display apparatus further comprises at least one optical element for optically combining the projection of the rendered first image with the projection of the rendered second image, wherein the processor of the display apparatus is configured to determine, based upon the detected gaze direction of the user, a region of the at least one optical element onto which the projection of the first region of the rendered first image and the projection of the rendered second image are to be focused, and to make an adjustment to focus the projection of the first region of the rendered first image and the projection of the rendered second image on said region of the at least one optical element. The at least one optical element may also be referred to as "at least one optical combiner". Herein, the term "optical element" refers to equipment (for example, such as optical components) for optically combining the projections of the rendered first and second images. In operation, the at least one optical element optically combines the projections of the rendered first and second images to constitute the combined projection. Optionally, the at least one optical element allows for optically combining the projection of the rendered first image with the projection of the rendered second image in a manner that the projection of the rendered second image and the projection of the first region of the first image are incident upon the fovea of the user's eyes, whereas a projection of a remaining region of the rendered first image is incident upon a remaining region of the retina of the user's eyes.

Optionally, the region of the at least one optical element onto which the projection of the first region of the rendered first image and the projection of the rendered second image are to be focused is determined based upon a location of region of interest of the input image. This allows for optically aligning the projection of the first region of the rendered first image and the projection of the rendered second image with respect to the projection of the remaining region of the rendered first image in a manner that corresponds to an alignment of the region of interest with respect to the remaining region of the input image. As a result, the visual scene appears optically undistorted to the user of the display apparatus.

Optionally, the display apparatus comprises an image steering unit, wherein the image steering unit is configured to make the adjustment to focus the projection of the first region of the rendered first image and the projection of the rendered second image on said region of the at least one optical element. Throughout the present disclosure, the term "image steering unit" used herein relates to equipment (for example, such as optical elements, electromechanical components, and so forth) for controlling a location of focusing the projection of the first region of the rendered first image and the projection of the rendered second image upon the at least one optical element. It will be appreciated that said region of the at least one optical element would change according to the change in the gaze direction of the user. In such a case, the image steering unit would dynamically adjust an optical path of the projection of the first region of the rendered first image and an optical path of the projection of the rendered second image in a manner that both the projection of the first region of the rendered first image and the projection of the rendered second image are incident upon a correct region of the at least one optical element. This allows for seamlessly implementing active foveation within the display apparatus.

Optionally, the at least one image steering unit comprises at least one actuator for moving at least one of: the at least one first image renderer, the at least one second image renderer, the at least one optical element. Notably, the movement implemented by way of such at least one actuator includes at least one of: displacement (horizontally and/or vertically), rotation and/or tilting of at least one of: the at least one first image renderer, the at least one second image renderer, the at least one optical element.

Optionally, the at least one optical element is implemented by way of at least one of: a lens, a mirror, a semi-transparent mirror, a semi-transparent film, a semi-transparent flexible membrane, a prism, a beam splitter, an optical waveguide, a polarizer.

The present disclosure also relates to the method as described above. Various embodiments and variants disclosed above apply mutatis mutandis to the method.

Optionally, when processing the input image to generate the first image, the method comprises:
  scaling down the input image to generate a semi-processed image, based upon a resolution of the input image and a resolution to be achieved for the first image;
  applying a blur filter to pixel values of a first region of the semi-processed image to generate a blurred image, wherein the first region of the semi-processed image corresponds to the first region of the first image; and
  applying a darkening effect to pixel values of a first region of the blurred image to generate the first image, wherein the first region of the blurred image corresponds to the first region of the first image.

Optionally, when processing the input image to generate the first image, the method comprises:
  scaling down the input image to generate a semi-processed image, based upon a resolution of the input image and a resolution to be achieved for the first image;
  applying a darkening effect to pixel values of a first region of the semi-processed image to generate a darkened image, wherein the first region of the semi-processed image corresponds to the first region of the first image; and
  applying a blur filter to pixel values of a first region of the darkened image to generate the first image, wherein the first region of the darkened image corresponds to the first region of the first image.

Optionally, when processing the input image to generate the first image, the method comprises generating the first region of the first image by:
(a) selecting an array of pixels comprising a given pixel of the input image and a plurality of neighbouring pixels of the given pixel;
(b) discarding a pixel value of at least one pixel of said array that is brighter than remaining pixels of said array; and
(c) determining a pixel value of a given pixel of the first image or an intermediate image by calculating an average of pixel values of the remaining pixels.

Optionally, when processing the input image to generate the first image, the method comprises performing aforesaid operations (a) to (c) recursively, based upon a resolution of the input image and a resolution to be achieved for the first image.

Optionally, when processing the input image to generate the first image, the method comprises generating the first region of the first image by:
(i) selecting a plurality of neighbouring pixels surrounding a given pixel of the input image;

(ii) determining an average pixel value by calculating an average of pixel values of the plurality of neighbouring pixels; and
(iii) determining a pixel value of a given pixel of the first image or an intermediate image by selecting a minimum value out of an original pixel value of the given pixel of the input image and the average pixel value.

Optionally, when processing the input image to generate the first image, the method comprises performing aforesaid operations (i) to (iii) recursively, based upon a resolution of the input image and a resolution to be achieved for the first image.

Optionally, when processing the input image to generate the second image, the method comprises calculating pixel values of the second image in a manner that a sum of a pixel value of a given pixel of the second image and a pixel value of a corresponding pixel of the first region of the first image lies within a given threshold from an original pixel value of a corresponding pixel of the input image, wherein a projection of the given pixel of the rendered second image is to be optically combined with a projection of the corresponding pixel of the first region of the rendered first image.

Optionally, the method comprises generating the first and second images in a manner that a first transition area within the first region of the first image fades on going from an outer periphery of the first transition area towards an inner periphery of the first transition area, while a second transition area within the second image fades on going from an inner periphery of the second transition area towards an outer periphery of the second transition area, wherein a projection of the first transition area is to substantially overlap with a projection of the second transition area when the first and second images are rendered.

Optionally, the method comprises generating the first and second images based upon scene information pertaining to the input image, wherein the scene information comprises information pertaining to at least one of: a type of visual scene being presented by the input image, a texture of at least one object present in the visual scene or at least a portion of the at least one object, a material category of at least one object present in the visual scene or at least a portion of the at least one object.

Optionally, the method comprises analyzing an image content of the input image to determine the scene information pertaining to the input image.

Optionally, in the method, the display apparatus comprises means for detecting a gaze direction of a user, and wherein the method comprises:
  receiving, from said means, information indicative of the detected gaze direction of the user;
  determining a region of interest of the input image based upon the detected gaze direction of the user; and
  processing the input image to generate the first image and the second image, based upon the region of interest of the input image, wherein the second image and the first region of the first image substantially correspond to the region of interest of the input image.

Optionally, in the method, the display apparatus comprises means for detecting a gaze direction of a user, and wherein the method comprises:
  receiving, from said means, information indicative of the detected gaze direction of the user; and
  controlling the image source to produce the input image based upon the detected gaze direction of the user.

Optionally, in the method, the image source comprises at least one camera, and wherein the method comprises controlling at least one actuator to adjust an orientation of the at least one camera based upon the detected gaze direction of the user.

Optionally, in the method, the display apparatus comprises means for tracking a head orientation of a user, and wherein the method comprises:
  receiving, from said means, information indicative of the head orientation of the user; and
  controlling the image source to produce the input image based upon the head orientation of the user.

Optionally, in the method, the image source comprises at least one camera, and wherein the method comprises controlling at least one actuator to adjust an orientation of the at least one camera based upon the head orientation of the user.

The present disclosure also relates to the computer program product as described above. Various embodiments and variants disclosed above apply mutatis mutandis to the computer program product.

DETAILED DESCRIPTION OF THE DRAWINGS

Referring to FIG. 1, illustrated is a block diagram of a high-level architecture of a system 100 for processing images for a display apparatus 102, in accordance with an embodiment of the present disclosure. The system 100 is at least communicably coupled to the display apparatus 102. The display apparatus 102 comprises at least one first image renderer (depicted as a first image renderer 104) and at least one second image renderer (depicted as a second image renderer 106). The system 100 comprises an image source 108 and at least one processor (depicted as a processor 110) communicably coupled to the image source 108. The image source 108 is to be employed to produce an input image. The at least one processor 110 is configured to:
  process the input image to generate a first image in a manner that at least a first region of the first image is blurred with respect to a corresponding region of the input image, an intensity of the first region of the first image is reduced with respect to an intensity of the corresponding region of the input image; and
  process the input image to generate a second image in a manner that the second image corresponds to a cropped region of the input image and an intensity of the second image is adjusted according to the intensity of the first region of the first image;
  wherein the at least one processor 110 or a processor 112 of the display apparatus 102 is configured to render the first image at the at least one first image renderer 104, whilst rendering the second image at the at least one second image renderer 106, wherein a projection of the rendered first image is to be optically combined with a projection of the rendered second image in a manner that the projection of the rendered second image substantially overlaps with the projection of the first region of the rendered first image.

It may be understood by a person skilled in the art that the FIG. 1 includes a simplified architecture of the system 100 for sake of clarity, which should not unduly limit the scope of the claims herein. The person skilled in the art will recognize many variations, alternatives, and modifications of embodiments of the present disclosure.

Figure 2:
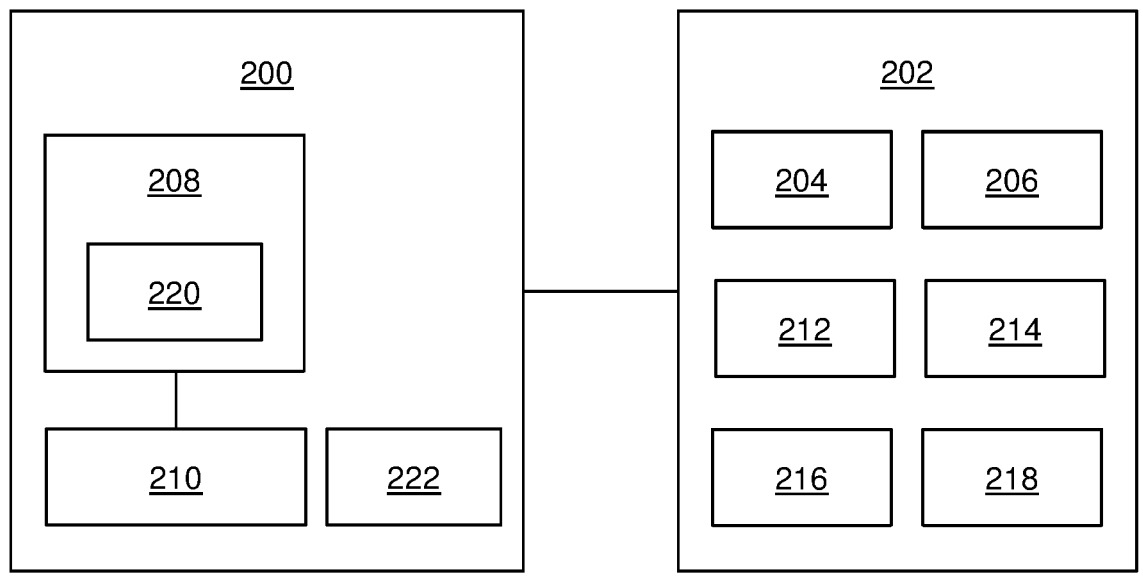

Referring to FIG. 2, illustrated is a block diagram of a high-level architecture of a system 200 for processing images for a display apparatus 202, in accordance with another embodiment of the present disclosure. The system 200 is at least communicably coupled to the display apparatus 202. The display apparatus 202 comprises at least one first image renderer (depicted as a first image renderer 204)

and at least one second image renderer (depicted as a second image renderer 206). The system 200 comprises an image source 208 and at least one processor (depicted as a processor 210) communicably coupled to the image source 208. The display apparatus 202 is also shown to include a processor 212.

The display apparatus 202 further comprises means 214 for detecting a gaze direction of a user, wherein the at least one processor 210 is configured to:

receive, from said means 214, information indicative of the detected gaze direction of the user;

determine a region of interest of the input image based upon the detected gaze direction of the user; and process the input image to generate the first image and the second image, based upon the region of interest of the input image, wherein the second image and the first region of the first image substantially correspond to the region of interest of the input image. In this regard, the display apparatus 202 further comprises at least one optical element (depicted as an optical element 216) for optically combining the projection of the rendered first image with the projection of the rendered second image, wherein the processor 212 of the display apparatus 202 is configured to determine, based upon the detected gaze direction of the user, a region of the at least one optical element 216 onto which the projection of the first region of the rendered first image and the projection of the rendered second image are to be focused, and to make an adjustment to focus the projection of the first region of the rendered first image and the projection of the rendered second image on said region of the at least one optical element 216.

The at least one processor 210 is configured to:

receive, from said means 214, information indicative of the detected gaze direction of the user; and control the image source 208 to produce the input image based upon the detected gaze direction of the user.

Furthermore, the display apparatus 202 comprises means 218 for tracking a head orientation of a user, wherein the at least one processor 210 is configured to:

receive, from said means 218, information indicative of the head orientation of the user; and control the image source 208 to produce the input image based upon the head orientation of the user.

The image source 208 comprises at least one camera (depicted as a camera 220), the system 200 further comprising at least one actuator (depicted as an actuator 222) for adjusting an orientation of the at least one camera 220, wherein the at least one processor 210 is configured to control the at least one actuator 222 to adjust the orientation of the at least one camera 220 based upon the detected gaze direction of the user and/or the head orientation of the user.

It may be understood by a person skilled in the art that the FIG. 2 includes a simplified architecture of the system 200 for sake of clarity, which should not unduly limit the scope of the claims herein. The person skilled in the art will recognize many variations, alternatives, and modifications of embodiments of the present disclosure.

Figure 3:
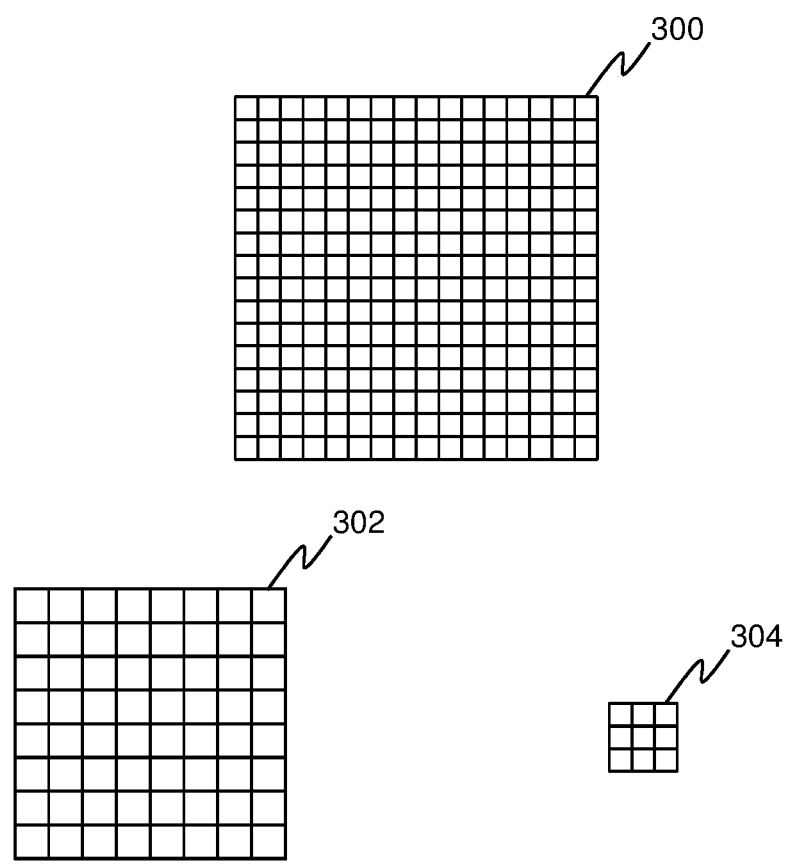
FIG. 3 is a schematic illustration of an input image, a first image and a second image, in accordance with an embodiment of the present disclosure.

Referring to FIG. 3, illustrated is a schematic illustration of an input image 300, a first image 302 and a second image 304, in accordance with an embodiment of the present disclosure. The input image 300 is processed to generate the first image 302 and the second image 304. As shown, the second image 304 corresponds to a cropped region of the input image 300.

It may be understood by a person skilled in the art that the FIG. 3 includes simplified exemplary schematic illustrations of the input image 300, the first image 302 and the second image 304 for sake of clarity, which should not unduly limit the scope of the claims herein. The person skilled in the art will recognize many variations, alternatives, and modifications of embodiments of the present disclosure.

Figure 4:
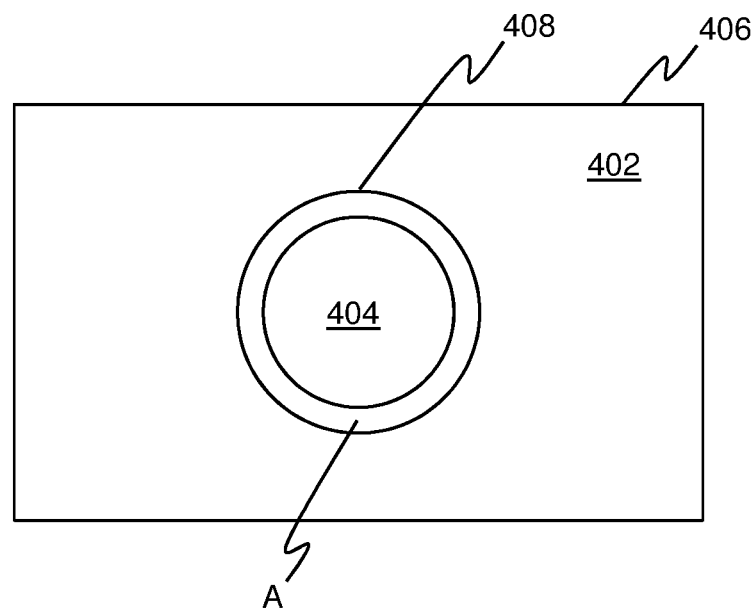
FIG. 4 is a schematic illustration of a first image and a second image as rendered via at least one first image renderer and at least one second image renderer, respectively, in accordance with an embodiment of the present disclosure.

Referring to FIG. 4, illustrated is a schematic illustration of a first image 402 and a second image 404 as rendered via at least one first image renderer (depicted as a first image renderer 406) and at least one second image renderer (depicted as a second image renderer 408), respectively, in accordance with an embodiment of the present disclosure. The second image 404 appears to substantially overlap with a first region of the first image 402. Furthermore, a first transition area within the first region of the first image 402 appears to substantially overlap with a second transition area within the second image 404. Such an overlapping region of the first and second transition areas is depicted by way of region A.

It may be understood by a person skilled in the art that the FIG. 4 includes simplified exemplary schematic illustrations of the first image 402 and the second image 404 for sake of clarity, which should not unduly limit the scope of the claims herein. The person skilled in the art will recognize many variations, alternatives, and modifications of embodiments of the present disclosure. The shape of the first image 402 and the second image 404 may for instance be ellipse, polygon or circle or approximation thereof.

Figure 5:
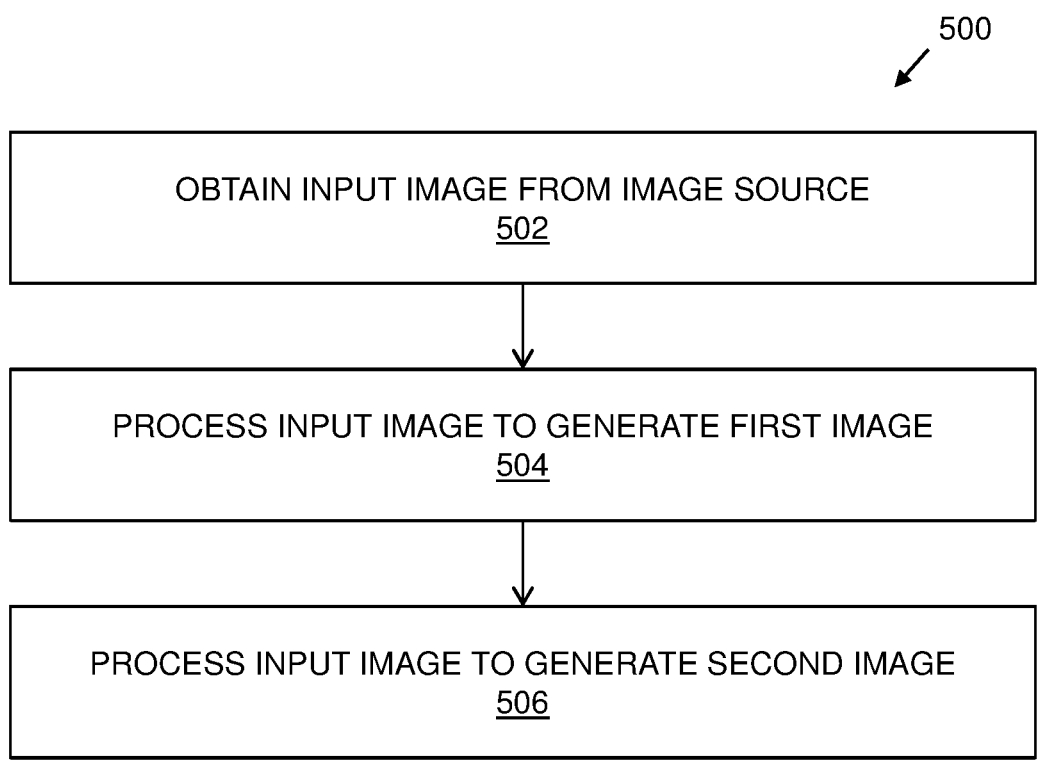
FIG. 5 illustrates steps of a method for producing images for a display apparatus, in accordance with an embodiment of the present disclosure.

Referring to FIG. 5, illustrated are steps of a method 500 for producing images for a display apparatus, in accordance with an embodiment of the present disclosure. The display apparatus comprises at least one first image renderer and at least one second image renderer.

At a step 502, an input image is obtained from an image source.

At a step 504, the input image is processed to generate a first image in a manner that at least a first region of the first image is blurred with respect to a corresponding region of the input image. An intensity of the first region of the first image is reduced with respect to an intensity of the corresponding region of the input image.

At a step 506, the input image is processed to generate a second image in a manner that the second image corresponds to a cropped region of the input image and an intensity of the second image is adjusted according to the intensity of the first region of the first image.

The first image is to be rendered at the at least one first image renderer, whilst rendering the second image at the at least one second image renderer, and wherein a projection of the rendered first image is to be optically combined with a projection of the rendered second image in a manner that the projection of the rendered second image substantially overlaps with the projection of the first region of the rendered first image.

The steps 502 to 506 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for processing images for a display apparatus, the system being at least communicably coupled to the display apparatus, the display apparatus comprising at least one first image renderer and at least one second image renderer, the system comprising an image source and at least one processor communicably coupled to the image source, wherein the image source is to be employed to produce an input image, the at least one processor being configured to:
   process the input image to generate a first image in a manner that at least a first region of the first image is blurred with respect to a corresponding region of the input image, an intensity of the first region of the first image is reduced with respect to an intensity of the corresponding region of the input image; and
   process the input image to generate a second image in a manner that the second image corresponds to a cropped region of the input image and an intensity of the second image is adjusted according to the intensity of the first region of the first image;
   wherein the at least one processor or a processor of the display apparatus is configured to render the first image at the at least one first image renderer, whilst rendering the second image at the at least one second image renderer, wherein a projection of the rendered first image is to be optically combined with a projection of the rendered second image in a manner that the projection of the rendered second image overlaps with the projection of the first region of the rendered first image.

2. The system of claim 1, wherein when processing the input image to generate the first image, the at least one processor is configured to:
   scaling down the input image to generate a semi-processed image, based upon a resolution of the input image and a resolution to be achieved for the first image;
   apply a blur filter to pixel values of a first region of the semi-processed image to generate a blurred image, wherein the first region of the semi-processed image corresponds to the first region of the first image; and
   apply a darkening effect to pixel values of a first region of the blurred image to generate the first image, wherein the first region of the blurred image corresponds to the first region of the first image.

3. The system of claim 1, wherein when processing the input image to generate the first image, the at least one processor is configured to:
   scaling down the input image to generate a semi-processed image, based upon a resolution of the input image and a resolution to be achieved for the first image;
   apply a darkening effect to pixel values of a first region of the semi-processed image to generate a darkened image, wherein the first region of the semi-processed image corresponds to the first region of the first image; and
   apply a blur filter to pixel values of a first region of the darkened image to generate the first image, wherein the first region of the darkened image corresponds to the first region of the first image.

4. The system of claim 1, wherein when processing the input image to generate the first image, the at least one processor is configured to generate the first region of the first image by:
   (a) selecting an array of pixels comprising a given pixel of the input image and a plurality of neighbouring pixels of the given pixel;
   (b) discarding a pixel value of at least one pixel of said array that is brighter than remaining pixels of said array; and
   (c) determining a pixel value of a given pixel of the first image or an intermediate image by calculating an average of pixel values of the remaining pixels.

5. The system of claim 4, wherein when processing the input image to generate the first image, the at least one processor is configured to perform aforesaid operations (a) to (c) recursively, based upon a resolution of the input image and a resolution to be achieved for the first image.

6. The system of claim 1, wherein when processing the input image to generate the first image, the at least one processor is configured to generate the first region of the first image by:
   (i) selecting a plurality of neighbouring pixels surrounding a given pixel of the input image;
   (ii) determining an average pixel value by calculating an average of pixel values of the plurality of neighbouring pixels; and
   (iii) determining a pixel value of a given pixel of the first image or an intermediate image by selecting a minimum value out of an original pixel value of the given pixel of the input image and the average pixel value.

7. The system of claim 6, wherein when processing the input image to generate the first image, the at least one processor is configured to perform aforesaid operations (i) to (iii) recursively, based upon a resolution of the input image and a resolution to be achieved for the first image.

8. The system of claim 4, wherein the average is a weighted average.

9. The system of claim 1, wherein when processing the input image to generate the second image, the at least one processor is configured to calculate pixel values of the second image in a manner that a sum of a pixel value of a given pixel of the second image and a pixel value of a corresponding pixel of the first region of the first image lies within a given threshold from an original pixel value of a corresponding pixel of the input image, wherein a projection of the given pixel of the rendered second image is to be optically combined with a projection of the corresponding pixel of the first region of the rendered first image.

10. The system of claim 1, wherein the at least one processor is configured to generate the first and second images in a manner that a first transition area within the first region of the first image fades on going from an outer periphery of the first transition area towards an inner periphery of the first transition area, while a second transition area within the second image fades on going from an inner periphery of the second transition area towards an outer periphery of the second transition area, wherein a projection of the first transition area is to substantially overlap with a projection of the second transition area when the first and second images are rendered.

11. The system of claim 1, wherein the at least one processor is configured to generate the first and second images based upon scene information pertaining to the input image, wherein the scene information comprises information pertaining to at least one of: a type of visual scene being presented by the input image, a texture of at least one object present in the visual scene or at least a portion of the at least one object, a material category of at least one object present in the visual scene or at least a portion of the at least one object.

12. The system of claim 11, wherein the at least one processor is configured to analyze an image content of the input image to determine the scene information pertaining to the input image.

13. The system of claim 1, wherein the display apparatus comprises means for detecting a gaze direction of a user, wherein the at least one processor is configured to:
- receive, from said means, information indicative of the detected gaze direction of the user;
- determine a region of interest of the input image based upon the detected gaze direction of the user; and
- process the input image to generate the first image and the second image, based upon the region of interest of the input image, wherein the second image and the first region of the first image substantially correspond to the region of interest of the input image.

14. The system of claim 13, wherein the display apparatus further comprises at least one optical element for optically combining the projection of the rendered first image with the projection of the rendered second image, wherein the processor of the display apparatus is configured to determine, based upon the detected gaze direction of the user, a region of the at least one optical element onto which the projection of the first region of the rendered first image and the projection of the rendered second image are to be focused, and to make an adjustment to focus the projection of the first region of the rendered first image and the projection of the rendered second image on said region of the at least one optical element.

15. The system of claim 1, wherein the display apparatus comprises means for detecting a gaze direction of a user, wherein the at least one processor is configured to:
- receive, from said means, information indicative of the detected gaze direction of the user; and
- control the image source to produce the input image based upon the detected gaze direction of the user.

16. The system of claim 15, wherein the image source comprises at least one camera, the system further comprising at least one actuator for adjusting an orientation of the at least one camera, wherein the at least one processor is configured to control the at least one actuator to adjust the orientation of the at least one camera based upon the detected gaze direction of the user.

17. The system of claim 1, wherein the display apparatus comprises means for tracking a head orientation of a user, wherein the at least one processor is configured to:
- receive, from said means, information indicative of the head orientation of the user; and
- control the image source to produce the input image based upon the head orientation of the user.

18. The system of claim 17, wherein the image source comprises at least one camera, the system further comprising at least one actuator for adjusting an orientation of the at least one camera, wherein the at least one processor is configured to control the at least one actuator to adjust the orientation of the at least one camera based upon the head orientation of the user.

19. A method for processing images for a display apparatus, the display apparatus comprising at least one first image renderer and at least one second image renderer, the method comprising:
- obtaining an input image from an image source;
- processing the input image to generate a first image in a manner that at least a first region of the first image is blurred with respect to a corresponding region of the input image, an intensity of the first region of the first image is reduced with respect to an intensity of the corresponding region of the input image; and
- processing the input image to generate a second image in a manner that the second image corresponds to a cropped region of the input image and an intensity of the second image is adjusted according to the intensity of the first region of the first image;

wherein the first image is to be rendered at the at least one first image renderer, whilst rendering the second image at the at least one second image renderer, and wherein a projection of the rendered first image is to be optically combined with a projection of the rendered second image in a manner that the projection of the rendered second image overlaps with the projection of the first region of the rendered first image.

20. The method of claim 19, wherein when processing the input image to generate the first image, the method comprises:
- scaling down the input image to generate a semi-processed image, based upon a resolution of the input image and a resolution to be achieved for the first image;
- applying a blur filter to pixel values of a first region of the semi-processed image to generate a blurred image, wherein the first region of the semi-processed image corresponds to the first region of the first image; and
- applying a darkening effect to pixel values of a first region of the blurred image to generate the first image, wherein the first region of the blurred image corresponds to the first region of the first image.

21. The method of claim 19, wherein when processing the input image to generate the first image, the method comprises:
- scaling down the input image to generate a semi-processed image, based upon a resolution of the input image and a resolution to be achieved for the first image;
- applying a darkening effect to pixel values of a first region of the semi-processed image to generate a darkened image, wherein the first region of the semi-processed image corresponds to the first region of the first image; and
- applying a blur filter to pixel values of a first region of the darkened image to generate the first image, wherein the first region of the darkened image corresponds to the first region of the first image.

22. The method of claim 19, wherein when processing the input image to generate the first image, the method comprises generating the first region of the first image by:
- (a) selecting an array of pixels comprising a given pixel of the input image and a plurality of neighbouring pixels of the given pixel;
- (b) discarding a pixel value of at least one pixel of said array that is brighter than remaining pixels of said array; and
- (c) determining a pixel value of a given pixel of the first image or an intermediate image by calculating an average of pixel values of the remaining pixels.

23. The method of claim 22, wherein when processing the input image to generate the first image, the method comprises performing aforesaid operations (a) to (c) recursively, based upon a resolution of the input image and a resolution to be achieved for the first image.

24. The method of claim 19, wherein when processing the input image to generate the first image, the method comprises generating the first region of the first image by:

(ii) determining an average pixel value by calculating an average of pixel values of the plurality of neighbouring pixels; and (iii) determining a pixel value of a given pixel of the first image or an intermediate image by selecting a minimum value out of an original pixel value of the given pixel of the input image and the average pixel value.

25. The method of claim 24, wherein when processing the input image to generate the first image, the method comprises performing aforesaid operations (i) to (iii) recursively, based upon a resolution of the input image and a resolution to be achieved for the first image.

26. The method of claim 19, wherein when processing the input image to generate the second image, the method comprises calculating pixel values of the second image in a manner that a sum of a pixel value of a given pixel of the second image and a pixel value of a corresponding pixel of the first region of the first image lies within a given threshold from an original pixel value of a corresponding pixel of the input image, wherein a projection of the given pixel of the rendered second image is to be optically combined with a projection of the corresponding pixel of the first region of the rendered first image.

27. The method of claim 19, wherein the method comprises generating the first and second images in a manner that a first transition area within the first region of the first image fades on going from an outer periphery of the first transition area towards an inner periphery of the first transition area, while a second transition area within the second image fades on going from an inner periphery of the second transition area towards an outer periphery of the second transition area, wherein a projection of the first transition area is to substantially overlap with a projection of the second transition area when the first and second images are rendered.

28. The method of claim 19, wherein the method comprises generating the first and second images based upon scene information pertaining to the input image, wherein the scene information comprises information pertaining to at least one of: a type of visual scene being presented by the input image, a texture of at least one object present in the visual scene or at least a portion of the at least one object, a material category of at least one object present in the visual scene or at least a portion of the at least one object.

29. The method of claim 28, wherein the method comprises analyzing an image content of the input image to determine the scene information pertaining to the input image.

30. The method of claim 19, wherein the display apparatus comprises means for detecting a gaze direction of a user, and wherein the method comprises:
receiving, from said means, information indicative of the detected gaze direction of the user;
determining a region of interest of the input image based upon the detected gaze direction of the user; and
processing the input image to generate the first image and the second image, based upon the region of interest of the input image, wherein the second image and the first region of the first image substantially correspond to the region of interest of the input image.

31. The method of claim 19, wherein the display apparatus comprises means for detecting a gaze direction of a user, and wherein the method comprises:
receiving, from said means, information indicative of the detected gaze direction of the user; and
controlling the image source to produce the input image based upon the detected gaze direction of the user.

32. The method of claim 31, wherein the image source comprises at least one camera, and wherein the method comprises controlling at least one actuator to adjust an orientation of the at least one camera based upon the detected gaze direction of the user.

33. The method of claim 19, wherein the display apparatus comprises means for tracking a head orientation of a user, and wherein the method comprises:
receiving, from said means, information indicative of the head orientation of the user; and
controlling the image source to produce the input image based upon the head orientation of the user.

34. The method of claim 33, wherein the image source comprises at least one camera, and wherein the method comprises controlling at least one actuator to adjust an orientation of the at least one camera based upon the head orientation of the user.

35. A computer program product comprising a non-transitory machine-readable data storage medium having stored thereon program instructions that, when accessed by a processing device, cause the processing device to:
obtain, from an image source, an input image;
process the input image to generate a first image in a manner that at least a first region of the first image is blurred with respect to a corresponding region of the input image, an intensity of the first region of the first image is reduced with respect to an intensity of the corresponding region of the input image; and
process the input image to generate a second image in a manner that the second image corresponds to a cropped region of the input image and an intensity of the second image is adjusted according to the intensity of the first region of the first image;
wherein the processing device is communicably coupled to a display apparatus, the display apparatus comprising at least one first image renderer and at least one second image renderer, wherein the first image is to be rendered at the at least one first image renderer, whilst rendering the second image at the at least one second image renderer, and wherein a projection of the rendered first image is to be optically combined with a projection of the rendered second image in a manner that the projection of the rendered second image overlaps with the projection of the first region of the rendered first image.

* * * * *